(12) United States Patent
Dunko

(10) Patent No.: US 8,489,118 B2
(45) Date of Patent: **\*Jul. 16, 2013**

(54) SYSTEMS AND METHODS FOR EVENT ATTENDANCE NOTIFICATION

(75) Inventor: Gregory A. Dunko, Cary, NC (US)

(73) Assignee: HTC Corporation, Taoyuan, Taoyuan County (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/564,894

(22) Filed: Aug. 2, 2012

(65) Prior Publication Data

US 2013/0103761 A1 Apr. 25, 2013

Related U.S. Application Data

(63) Continuation of application No. 13/276,399, filed on Oct. 19, 2011, now Pat. No. 8,260,321.

(51) Int. Cl.
*H04W 24/00* (2009.01)
(52) U.S. Cl.
USPC ................ 455/456.3; 455/456.1; 455/456.5; 455/414.2; 455/404.2; 455/563

(58) Field of Classification Search
USPC ............ 455/563, 456.1, 456.5, 414.2, 404.2, 455/456.3; 709/206, 204, 223, 224
See application file for complete search history.

(56) References Cited

U.S. PATENT DOCUMENTS

| 6,181,928 | B1 | 1/2001 | Moon | |
|---|---|---|---|---|
| 2003/0045301 | A1* | 3/2003 | Wollrab | 455/456 |
| 2008/0091786 | A1* | 4/2008 | Jhanji | 709/206 |
| 2008/0209011 | A1* | 8/2008 | Stremel et al. | 709/219 |

\* cited by examiner

*Primary Examiner* — Manpreet Matharu
(74) *Attorney, Agent, or Firm* — McClure, Qualey & Rodack, LLP

(57) ABSTRACT

Systems and methods for event attendance notification are provided. A representative systems includes a mobile device operative to: receive member information corresponding to members of a social network; receive event information corresponding to a first event, designated to occur at a first location, wherein at least a first of the members is scheduled to attend the first event; and responsive to determining that the current location of the first of the members corresponds to the event information, enable attendance information to be sent to others of the members of the social network indicating that the first of the members is at the first event.

16 Claims, 4 Drawing Sheets

SYSTEMS AND METHODS FOR EVENT ATTENDANCE NOTIFICATION

CROSS-REFERENCE TO RELATED APPLICATION

The present application is a continuation application of U.S. patent application Ser. No. 13/276,399 filed on Oct. 19, 2011, the disclosure of which is incorporated by reference herein in its entirety.

TECHNICAL FIELD

The present disclosure generally relates to event attendance notification in a social network environment.

BACKGROUND

Over the years, portable handheld devices such as smartphones have become prevalent. With the rapid development in communication technology, smartphones have become an integral part of many people's lives given the portability of smartphones, the convenient access to the Internet, and the growing number of applications available on smartphones. With the wide popularity of social networking, communities of users often stay connected through the Internet. Unfortunately, although the social demands for staying connected are tending to increase, there are times when meeting these demands become somewhat taxing, particularly when a user is trying to keep up with a busy schedule.

SUMMARY

Briefly described, one embodiment, among others, is an event attendance notification system that comprises a mobile device that is operative to: receive member information corresponding to members of a social network; receive event information corresponding to a first event, designated to occur at a first location, wherein at least a first of the members is scheduled to attend the first event; and responsive to determining that the current location of the first of the members corresponds to the event information, enable attendance information to be sent to others of the members of the social network indicating that the first of the members is at the first event.

Another embodiment is a method for event attendance notification, comprising: receiving member information corresponding to members of a social network; receiving event information corresponding to a first event, designated to occur at a first location, wherein at least a first of the members is scheduled to attend the first event; and responsive to determining that the current location of the first of the members corresponds to the event information, enabling attendance information to be sent to others of the members of the social network indicating that the first of the members is at the first event.

Another embodiment is a computer-readable medium having stored thereon computer-executable instructions, which, when executed by a computer processor, enable performance of the method comprising: receiving member information corresponding to members of a social network; receiving event information corresponding to a first event, designated to occur at a first location, wherein at least a first of the members is scheduled to attend the first event; and responsive to determining that the current location of the first of the members corresponds to the event information, enabling attendance information to be sent to others of the members of the social network indicating that the first of the members is at the first event.

Other systems, methods, features, and advantages of the present disclosure will be or may become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
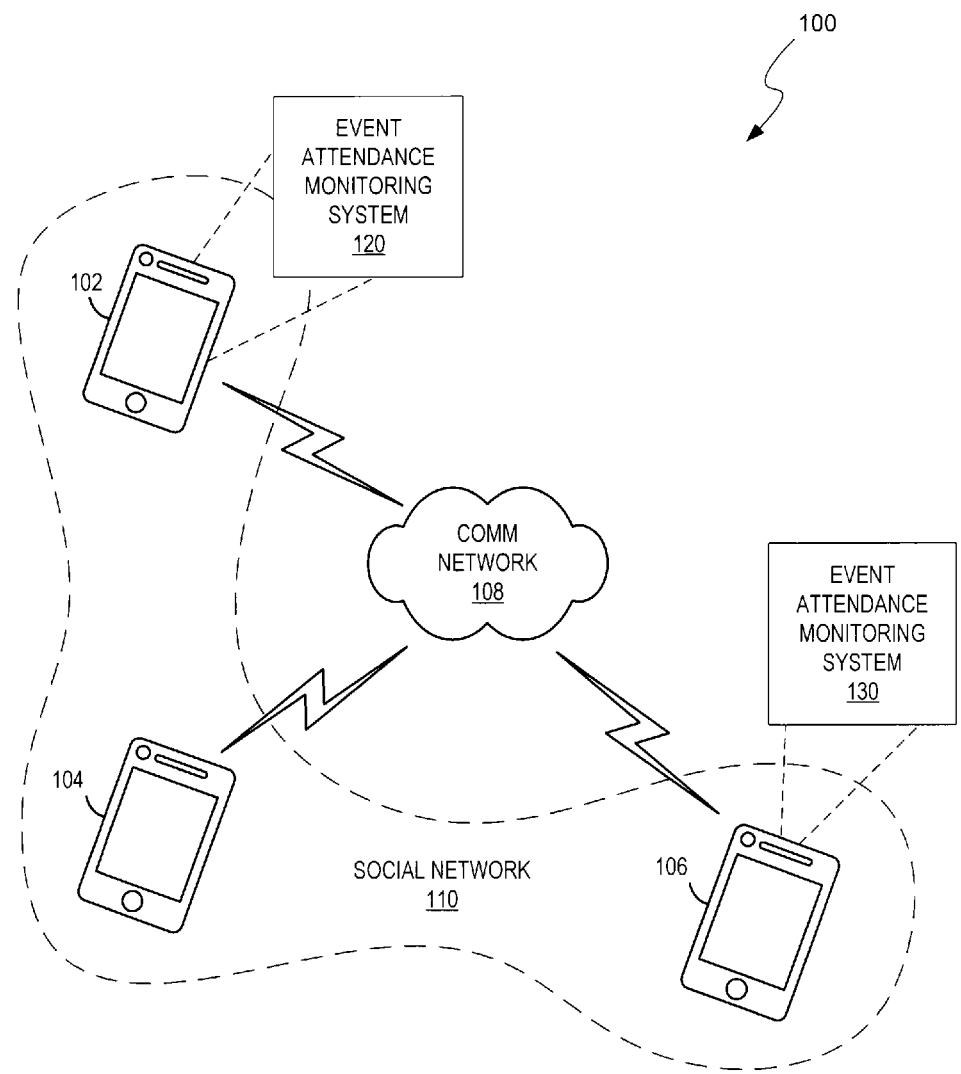
FIG. 1 is a block diagram of a networked environment in which an exemplary embodiment of a system for event attendance notification is implemented.

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

Systems and methods for event attendance notification are provided that, in some embodiments, permit a user of a mobile device who is member of a social network to provide information associated with attendance of an event to other members of the social network. By way of example, such an event can be scheduled in a calendar of the user and attendance information can be sent to the other members when a determination is made that the user has arrived at the location at which the event is scheduled to occur. In some embodiments, the mobile device includes location determination capability and the calendar is implemented as a function of social network server that facilitates the social network. Additionally, the attendance information can be configured as a user-defined message that is automatically sent from the mobile device in some embodiments, or as a status update posted to a website hosted by a social network server, among other configurations.

A description of an embodiment of a system for event attendance notification in a networked environment is now described followed by a discussion of the operation of various components within the system. In this regard, FIG. 1 is a block diagram of a networked environment in which an exemplary embodiment of a system for event attendance notification is implemented.

As shown in FIG. 1, event attendance notification system 100 includes mobile devices 102, 104 and 106 communicatively coupled via a communication network 108. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 102, 104 and 106 are associated with a social network 108 that enables the users to interact with each other with the mobile devices. Typically, a social network is facilitated by a website that may require a registration and login prior to use. However, regardless of how such a social network is implemented (be it web-based or not), the functionality of concern involves the ability to provide interaction among a limited group of members, as may be established by the members themselves. For instance, one manner to add a member to a social network may involve "friending" a member, while removing a member from a social network may involve "unfriending" the member. For the purpose of the example presented in FIG. 1, the limited group of members includes the users of mobile devices 102, 104 and 106.

In operation, event attendance notification system 100 facilitates correlation of information related to activities of members of the social network. Specifically, system 100 correlates information that identifies members of the social network with location information and event information pertaining to those members. As a result of such correlating, members of the social network can be updated as to whether other members attend (e.g., have arrived at) an event.

The aforementioned functions can be performed by various components in various embodiments. For example, the functionality can be highly distributed across a network or less so by use of functions performed on local devices, as in the case of mobile device 102.

In this regard, mobile device 102 includes an event attendance monitoring system 120, which can be implemented in numerous ways such as, for example and without limitation, an application executing on the mobile device. In operation, system 120 receives member information to uniquely identify members of the social network (in this case, users of mobile devices 102, 104 and 106). Additionally, system 120 receives event information corresponding to an event that at least one of the members is scheduled to attend. For example, the event information may include a location at which the event is to occur, a time that the event is scheduled to begin, an event description, an attendance/invite list, and a time that the event is scheduled to end. The event information can be resident in various forms in various locations such as, for example and without limitation, a calendar application synchronized with the mobile device and a web-based event scheduler.

System 120 also receives location information corresponding to a current location of the member that is scheduled to attend the event. In this case, the member is the user of mobile device 102 and the location information corresponds to the determined location of mobile device 102. It should be noted that various methods of determining the location of a mobile device can be used.

Responsive to determining that the current location of the member (based on the location of the associated mobile device) corresponds to the event information, system 120 enables attendance information to be sent to members of the social network. In some embodiments, correlation of the current location of the member with the event information is based on determining that the mobile device is within a predetermined distance from a specified event location within a predetermined period of time. By way of example, the predetermined period of time can include a window of time that includes the event start time (but can include any part of the event duration—to, for example, observe a "late arrival" by the user to an event).

Attendance information can be provided in various forms and can be provided in various manners. For instance, in some embodiments, attendance information can take the form of a message that is automatically sent from a mobile device (e.g., device 102) to other members of the social network (e.g., to devices 104 and 106). Such a message may be a user-defined message; for example, "I just wanted to let you know that I am at [event name automatically inserted here]." By way of further example, the system may prompt the member to send a message (e.g., a user-preselected message or a "canned" message).

In some embodiments, an event attendance monitoring system can be operative to receive invitation information corresponding to a request (e.g., an electronic meeting invitation) for a member to attend an event. Responsive to the invitation information, the system may update a database of such events that can be monitored for correlation as described before. In some embodiments, updating of the database of events is performed automatically responsive to determining that the invitation is from one of the members of the social network, for example.

Figure 2:
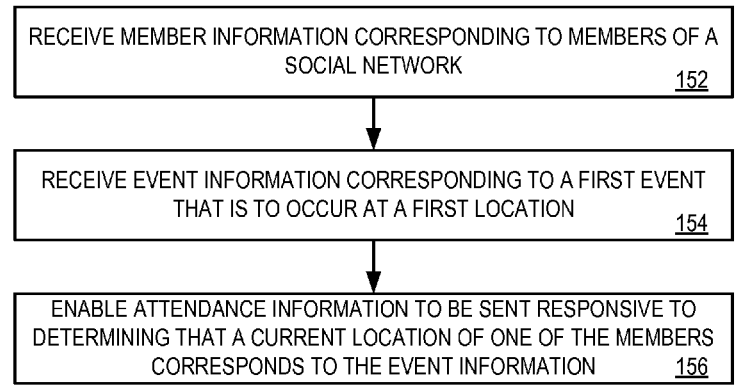
FIG. 2 is a flowchart depicting an exemplary embodiment of a method for event attendance notification such as may be performed by the system shown in FIG. 1.

FIG. 2 is a flowchart depicting an exemplary embodiment of a method for event attendance notification such as may be performed by mobile device 102 of FIG. 1. As shown in FIG. 2, the method includes the steps of: receiving member information corresponding to members of a social network (block 152); receiving event information corresponding to a first event that is to occur at a first location (block 154); and enabling attendance information to be sent to others of the members of the social network responsive to determining that the current location of the member, who is scheduled to attend the first event, corresponds to the event (block 156).

In some embodiments, the current location of a user can be checked against multiple event locations. Such a configuration could be used to determine whether the user has moved from one event to another, or has chosen to skip a first scheduled event in order to attend a subsequently-scheduled or concurrently-scheduled event. In some embodiments, the scheduled start time and/or duration of an event can be used in determining whether a user is attending an event. For example, if the user is in proximity of a location associated with a scheduled event within 15 minutes of the event start time or during the scheduled event, attendance of the event may be determined.

Referring back to FIG. 1, an event attendance monitoring system 130 is implemented by mobile device 106 that functions in a manner similar to that described with respect to mobile device 102. However, mobile device 104 lacks an event attendance monitoring system. Despite the lack of an event attendance monitoring system being resident on mobile device 104, comparable functionality may be perceived. Notably, much of the functionality can be provided by another device.

In this regard, correlating member information, event information and location information for a user of mobile device 104 can be performed by a remote event attendance monitoring system (e.g., system 130). In such a configuration, system 130 of mobile device 106 would be operative to receive information associated with the user of mobile device 104. Note that, in some embodiments, mobile device 104 could communicate its location information to mobile device 106. Additionally, or alternatively, mobile device 106 could engage in a form of local communication with mobile device 104, indicating that mobile device 104 is generally co-located with mobile device 106. As such, mobile device 106 may use its current location information for mobile device 104.

Thereafter, responsive to determining that the current location of mobile device 104 corresponds with an associated event, system 130 could provide attendance information to members of the social network. In this case, the attendance information could be provided in the form of a message (e.g., a text message) to mobile devices 102 and 106.

Figure 3:
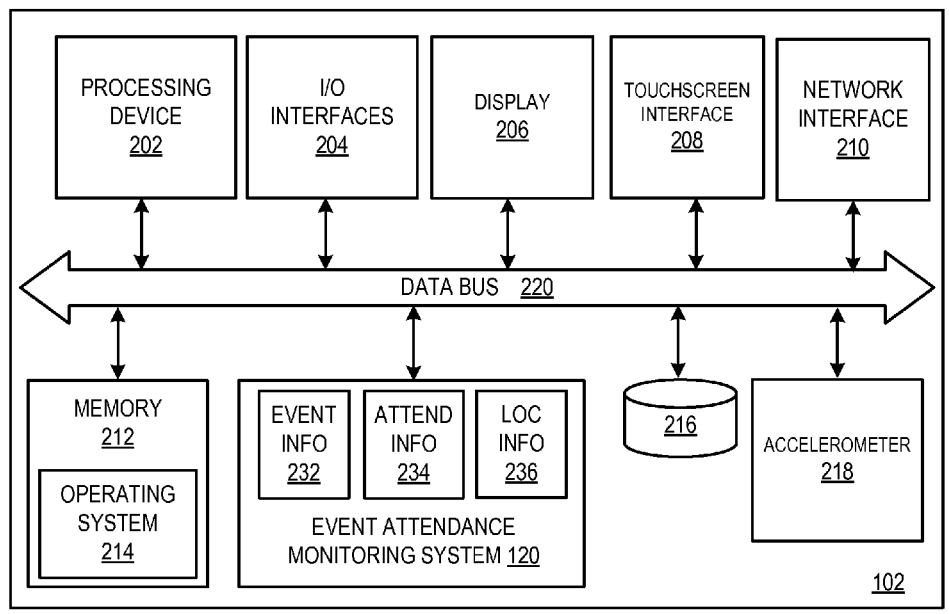
FIG. 3 illustrates an exemplary embodiment of a mobile device shown in FIG. 1.

FIG. 3 illustrates mobile device 102 shown in FIG. 1. As described earlier, mobile device 102 will typically be embodied as a smartphone but may also be embodied in any one of a wide variety of wired and/or wireless computing devices. As shown in FIG. 3, mobile device 102 includes a processing device (processor) 202, input/output interfaces 204, a display 206, a touchscreen interface 208, a network interface 210, a memory 212, and operating system 214, a mass storage 216 and an accelerometer 218, with each communicating across a local data bus 220. Additionally, mobile device 102 incorporates an event attendance monitoring system 120, which is depicted as including event information 232, attendance information 234 and location information 236, although the location of information 232, 234 and 236 could vary.

The processing device 202 may include any custom made or commercially available processor, a central processing unit (CPU) or an auxiliary processor among several processors associated with the mobile device 102, a semiconductor based microprocessor (in the form of a microchip), a macro-processor, one or more application specific integrated circuits (ASICs), a plurality of suitably configured digital logic gates, and other electrical configurations comprising discrete elements both individually and in various combinations to coordinate the overall operation of the system.

The memory 212 can include any one of a combination of volatile memory elements (e.g., random-access memory (RAM, such as DRAM, and SRAM, etc.)) and nonvolatile memory elements. The memory typically comprises native operating system 214, one or more native applications, emulation systems, or emulated applications for any of a variety of operating systems and/or emulated hardware platforms, emulated operating systems, etc. For example, the applications may include application specific software which may comprise some or all the components of the mobile device 102. In accordance with such embodiments, the components are stored in memory and executed by the processing device. Note that although depicted separately in FIG. 2, event attendance monitoring system 120 may be resident in memory such as memory 212.

Touchscreen interface 208 is configured to detect contact within the display area of the display 206 and provides such functionality as on-screen buttons, menus, keyboards, etc. that allows users to navigate user interfaces by touch. For some embodiments, the mobile device 102 further comprises an accelerometer 218 (or gyro) configured to detect motion, vibration and/or orientation of the mobile device 102.

One of ordinary skill in the art will appreciate that the memory 214 can, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIG. 3, network interface device 210 comprises various components used to transmit and/or receive data over a networked environment such as depicted in FIG. 1. When such components are embodied as an application, the one or more components may be stored on a non-transitory computer-readable medium and executed by the processing device.

Figure 4:
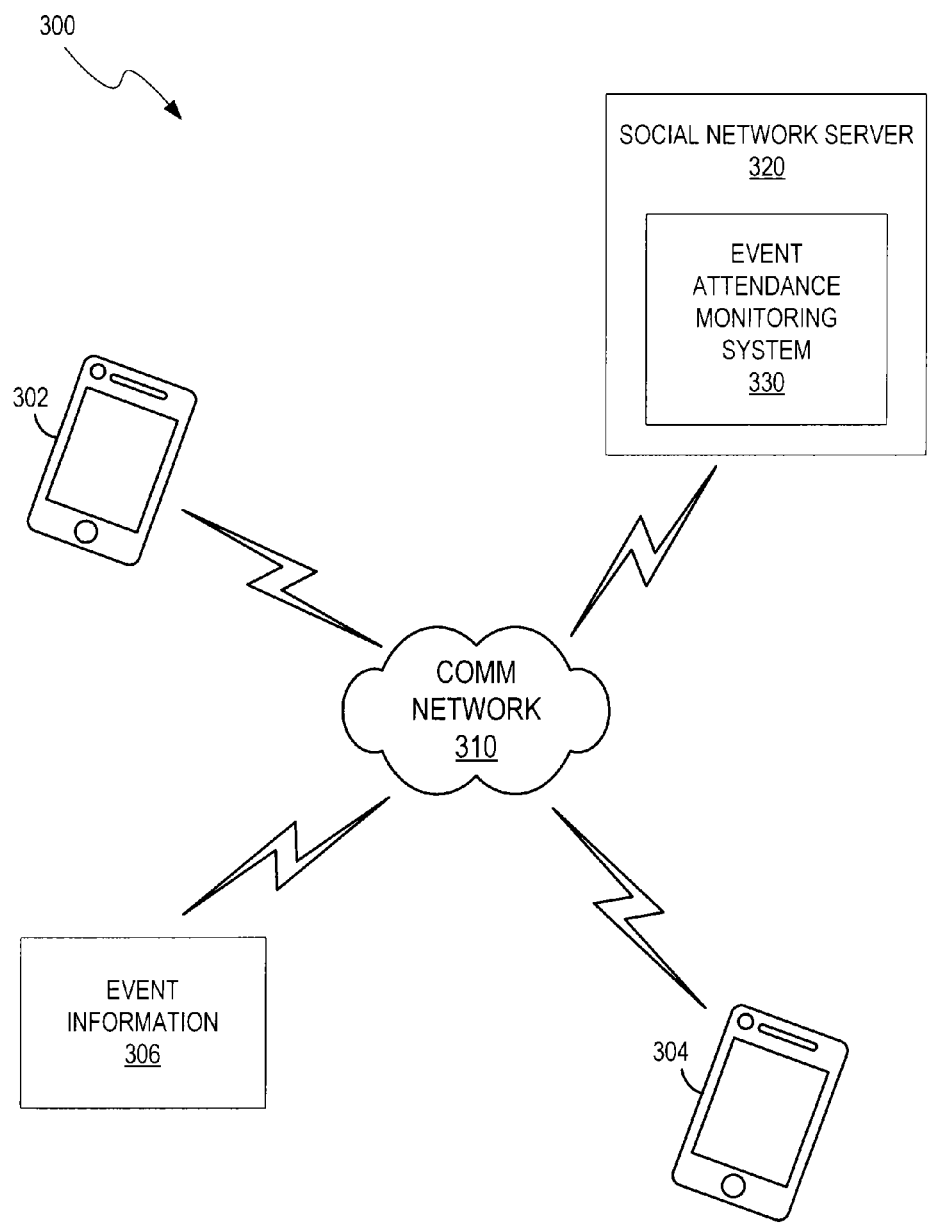
FIG. 4 is a block diagram of an alternative networked environment in which another exemplary embodiment of a system for event attendance notification is implemented.

FIG. 4 is a block diagram of an alternative networked environment in which another exemplary embodiment of a system for event attendance notification is implemented. As shown in FIG. 4, system 300 includes mobile devices 302 and 304 that are communicatively coupled via a communication network 310. Each of the mobile devices may be embodied as a mobile computing device such as, for example and without limitation, a smartphone that incorporates cellular telephone functionality. Notably, the communications network can use one or more of various communications types such as, for example and without limitation, cellular and Wi-Fi communications.

Users of mobile devices 302 and 304 are associated with a social network that enables the users to interact with each other using the mobile devices. In this embodiment, the social network is facilitated by a website that is hosted by social network server 320. As such, server 320 facilitates interaction among a limited group of members, as may be established by the members themselves. For the purpose of the example presented in FIG. 4, the limited group of members includes the users of mobile devices 302 and 304.

Additionally, server 320 implements an event attendance monitoring system 330 that facilitates correlation of information related to activities of members of the social network. Specifically, system 330 correlates information that identifies members of a social network with location information and event information pertaining to those members. As a result of such correlating, members of the social network can be updated as to whether members attend an event.

Figure 5:
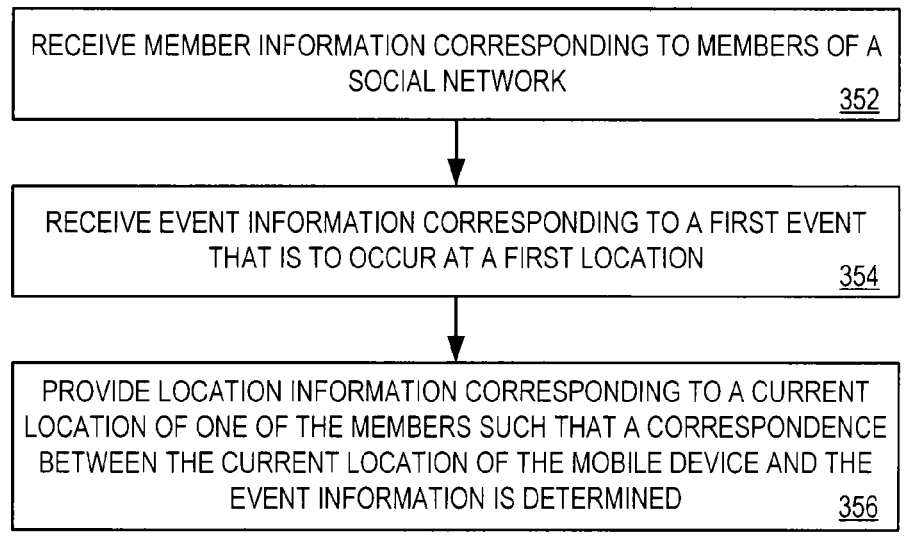
FIGS. 5 and 6 are flowcharts depicting alternative embodiments of methods for event attendance notification.

In order to facilitate the aforementioned functionality, various aspects may be performed by one or more of the mobile devices 302, 304. In this case, mobile device is operative to perform, at least in part, the method depicted in the flowchart of FIG. 5. Specifically, the method includes: receiving member information corresponding to members of a social network (block 352); receiving event information corresponding to a first event that is to occur at a first location (block 354); and providing location information corresponding to the current location of a mobile device so that a correspondence between the current location and the location of the event is determined (block 356). It should be noted that in some embodiments, a mobile device can be configured to receive event information (e.g., event information 306) by syncing with a calendar of events that resides on a different device or website.

Figure 6:
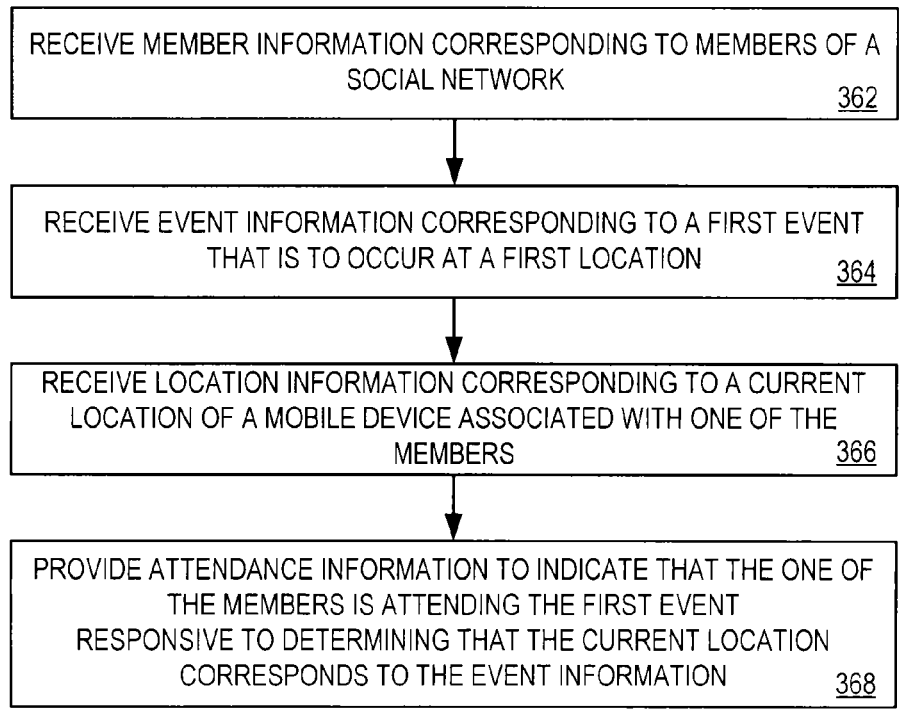

With respect to operation of event attendance monitoring system 330, system 330 is operative to perform, at least in part, the method depicted in the flowchart of FIG. 6. Specifically, the method includes: receiving member information corresponding to members of a social network (block 362); receiving event information corresponding to a first event that is to occur at a first location (block 364); receiving location information corresponding to the current location of a mobile device associated with one of the members (366); and providing attendance information to indicate that the member is attending the first event responsive to determining that the current location corresponds to the event information (block 368). In some embodiments, providing attendance information includes updating the posted status of the member at the social network website. As such, the mobile devices interact with the event attendance monitoring system of the social network server at least to the extent that the system is able to receive information for correlation. Thereafter, the system may communicate with one or more of the mobile devices, such as by providing attendance information to the mobile devices.

Various information (e.g., event information) can be received from various components for use by an attendance monitoring system. For instance, event information 306 (which is associated with the user of mobile device 302) is not provided to event attendance monitoring system 330 by mobile device 302. In this case, event information 306 is resident on a separate component (e.g., a calendar application resident on a laptop) that is not synced with mobile device 302. However, system 330 is provided with access to event information 330.

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the mobile device 102 shown in FIG. 1. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

At least the following is claimed:

1. An event attendance notification system, comprising:
   a mobile device operative to:
   receive member information corresponding to members of a social network;
   receive event information corresponding to a first event, designated to occur at a first location, wherein at least a first of the members is scheduled to attend the first event; and
   responsive to determining that the current location of the first of the members is within a predetermined distance of the first location such that the current location corresponds to the event information, automatically send attendance information to others of the members of the social network indicating that the first of the members is at the first event;
   automatically determine that the current location of the first of the members corresponds to second event information associated with a second event; and
   automatically send second attendance information to the others of the members indicating that the first of the members is at the second event.

2. The system of claim 1, wherein the mobile device is further operative to determine a current location of the first of the members.

3. The system of claim 1, wherein, in receiving the event information corresponding to the first event, the mobile device is further operative to receive information associated with an electronic calendar.

4. The system of claim 3, wherein the electronic calendar is synchronized with the mobile device.

5. The system of claim 1, further comprising a social network server operative to link the members of the social network and facilitate communication between the members via web-based interaction.

6. The system of claim 5, wherein, in enabling the attendance information to be sent, the mobile device is further operative to automatically provide information to the social network server such that the others of the members are updated about attendance of the event via social network server.

7. The system of claim 1, wherein the attendance information is a user-defined message.

8. The system of claim 1, wherein the mobile device is further operative to receive invitation information corresponding to an invitation to attend the first event and update a database of such events with the invitation information.

9. The system of claim 8, wherein updating of the database of events is performed automatically by the mobile device responsive to determining that the invitation information is from one of the members of the social network.

10. A method for event attendance notification, comprising:
    receiving, at a first mobile device, member information corresponding to members of a social network;
    receiving, at the first mobile device, event information corresponding to a first event, designated to occur at a first location, wherein at least a first of the members associated with the first mobile device is scheduled to attend the first event;
    receiving, at the first mobile device, information associated with a second mobile device of a second of the members of the social network, the information associated with the second mobile device being received at the first mobile device via a communication network;
    responsive to determining that the current location of the first of the members is within a predetermined distance of the first location such that the current location corresponds to the event information, automatically sending attendance information, via the first mobile device, to others of the members of the social network indicating that the first of the members is at the first event; and
    responsive to determining that the current location of the second of the members is within a predetermined distance of the first location such that the current location of the second of the members corresponds to the event information, automatically sending attendance information, via the communications network, to others of the members of the social network indicating that the second of the members is at the first event.

11. The method of claim 10, further comprising determining a current location of the first of the members.

12. The method of claim 10, wherein the determining a current location of the first of the members comprises automatically determining the current location using a mobile device.

13. The method of claim 10, wherein receiving event information comprises accessing a calendar of events stored on a mobile device associated with the first of the members.

14. The method of claim 10, wherein receiving event information comprises receiving an event invitation from another of the members of the social network.

15. The method of claim 10, wherein:
    each of receiving member information, receiving event information, determining a current location and enabling attendance information to be sent is performed automatically on a mobile device associated with the first of the members; and the current location is based on a position of the mobile device.

16. A non-transitory, tangible computer-readable medium having stored thereon computer-executable instructions, which, when executed by a computer processor, enable performance of the method comprising:

receiving, at a first mobile device, member information corresponding to members of a social network;

receiving, at the first mobile device, event information corresponding to a first event, designated to occur at a first location, wherein at least a first of the members associated with the first mobile device is scheduled to attend the first event;

receiving, at the first mobile device, information associated with a second mobile device of a second of the members of the social network, the information associated with the second mobile device being received at the first mobile device via a communication network;

responsive to determining that the current location of the first of the members is within a predetermined distance of the first location such that the current location corresponds to the event information, automatically sending attendance information to others of the members of the social network indicating that the first of the members is at the first event; and responsive to determining that the current location of the second of the members is within a predetermined distance of the first location such that the current location of the second of the members corresponds to the event information, automatically sending attendance information to others of the members of the social network indicating that the second of the members is at the first event.

* * * * *